United States Patent [19]

Nishiya

[11] Patent Number: 5,112,273

[45] Date of Patent: May 12, 1992

[54] PROCESS AND APPARATUS FOR SEPARATING FINE BONES FROM FISH FLAKES

[75] Inventor: Kyosuke Nishiya, Miyagi, Japan

[73] Assignee: Towa Chemical Industry Co. Ltd., Tokyo, Japan

[21] Appl. No.: 558,344

[22] Filed: Jul. 27, 1990

[30] Foreign Application Priority Data

Aug. 8, 1989 [JP] Japan ............................. 1-202804
Apr. 6, 1990 [JP] Japan ............................. 2-90247

[51] Int. Cl.⁵ ..................................... A22C 25/16
[52] U.S. Cl. ............................. 452/135; 452/198; 452/184; 209/288; 241/93
[58] Field of Search ............... 452/135, 198, 138, 184; 209/288, 300; 241/83, 91, 93; 426/56

[56] References Cited

U.S. PATENT DOCUMENTS

| | | | |
|---|---|---|---|
| 3,396,768 | 8/1968 | Kurihara | 452/138 |
| 3,896,522 | 7/1975 | Capeyre | 452/135 |
| 4,685,626 | 8/1987 | Kerdiles et al. | 452/138 |
| 4,976,973 | 12/1990 | Shirakawa et al. | 426/56 |

Primary Examiner—Willis Little
Attorney, Agent, or Firm—Beveridge, DeGrandi & Weilacher

[57] ABSTRACT

The present invention is a process and an apparatus for efficiently separating fine bones from fish flakes wherein fish flakes are dispersed after dehydration or dehydrated after dispersion, and separated using a sieve with a plate with slits formed thereon.

21 Claims, 4 Drawing Sheets

PROCESS AND APPARATUS FOR SEPARATING FINE BONES FROM FISH FLAKES

FIELD OF THE INVENTION

The present invention relates to a process and an apparatus for separating fine bones from fish flakes.

DESCRIPTION OF THE RELATED ARTS

There have been conventionally employed processes for utillizing fish caught in large quantities such as Alaska pollack, Atka mackerels, Saffron cod, Hoki, Rattails, Pacific cod, Pacific salmon. Among them, processes for separating fine bones to be used as foods comprises mainly selecting refined meat and used as food materials such as frozen SURIMI (ground frozen fish), KAMABOKO (fish jelly), DENBU, SOBORO, OYAKO-ZUKE and the like.

The demand for fish flakes has been increasing. However, any one of the processes are not suitable for producing them.

For example, the process for producing frozen SURIMI comprises separating meat by a meat separator, rinsing in water, then removing impurities such as fine bones, scales and the like by a refiner, compressing and dehydrating and freezing with sugars and phosphate.

The above process is a mass production process which provides products completely free from impurities such as fine bones, but involves problems. That is, when the dehydrated meat before adding sugars and phosphate is steamed and flaked, the product is like fine fibers or tangles of fibers which had been once fined down, resulting in unpleasant taste and unsuitable mouthfeel for foodstuff.

DENBU is prepared by powdering dried fish or salted and dried fish, and then by separating meat fibers from fine bones by wind force. Such process is disadvantageous because it provides product which appears flake but dried, that is process capability is too small for separating fine bones.

SOBORO and OYAKO-ZUKE are long-established foods, SOBORO is prepared by cutting Pacific cod, Alaska pollack or the like into three portions (two fillets and flesh-webbed skeleton), skinning, removing belly meat as well as fine bones present at the boundary between belly and back, steaming only back meat and crumbling to flake, adding soy sauce, mirin (sweet sake used as seasoning) and the like and boiling down. OYAKO-ZUKE is prepared by adding fish eggs to the above flakes and pickling in vinegar.

However, such processes are inevitably accompanied with the problem of the presence of fine bones no matter how carefully treated. Accordingly, the operation of removing fine bones by manual labor in the final step is required. These methods provide good products with less impurities, but all of them rely on manual labor and are not suitable for mass production.

Among the prior arts, as mentioned above, mass productive methods disadvantageously provides products with unsuitable qualities for flakes, while processes which provides products with suitable qualities depends on manual labor and are not suitable for mass production.

Further, as an apparatus for separating fine bones, Japanese Patent Publication No. 43327/1981 discloses an apparatus for electrically separating dried fish flakes from bone. The method is not a method to separate fine bones from wet fish flakes, which is one of the characteristics of the present invention.

When we eat boiled or roasted fish, we use chop sticks and pick out a piece of meat, which is ideal as a fish flake. Removing fine bones is extremely important in the process for production of products which we can directly eat.

For example, Alaska pollack has long and hard bones at the root of the fins (dorsal fin, pectoral fin, ventral fin, caudal fin) and between the meats under them in addition to the backbone, further it has long bones in the wall of the visceral cavity.

There are many thin bones of 10–30 mm length at the junction of back and belly meat. The bones of fin are readilly removed at the stage of the treatment of fish body and skinning, and the backbone at the stage of collecting meat after steaming. But the probability that fine bones in junction of back and belly meat are present in the flakes is extremely high. About fifty of fine bones are present per head of Alaska pollack. Accordingly, about ten Alaska pollacks are required to produce 1 kg of flakes, accompanied with about 500 fine bones present therein on calculation.

Actually, the number of fine bones present therein is less than the above value since some may be removed at the stage of the treatment of fish body. On calculation, however, about 500,000 fine bones are present in products when 1 ton of flakes are produced. When the flakes are white like fine bones, it is extremely difficult to distinguish bones from flakes and impossible to completely remove fine bones by manual labor.

In case of Alaska pollack, the color of flake is white like that of fine bones, furthermore the fine bones are thin, hard, pointed and sticks like a needle. Therefore, it is dangerous that they are present in food and accidentally eaten.

It is quite difficult to completely eliminate fine bones, which is required for production of foodstuff. It applies to other kinds of fish such as Atka mackerels, Saffron cod, Hoki, Rattails, Pacific cod, Pacific salmon and the like.

The production of flakes of Alaska pollack which is cheap and caught in large quantities has not been industrialized. It is partly because the effective methoes for elimination of fine bones have not been developed. Accordingly, the processes and apparatus to effectively eliminate fine bones from wet fish flakes by a process which can be applied for mass production are eagerly expected.

SUMMARY OF THE INVENTION

The present inventor has studied intensively on a method and an apparatus for separating fish flakes into meat and fine bones to solve the above problems. As the result, I have succeeded in effectively separating meat from fine bones by dispersing fish flakes after dehydration or dehydrating after dispersion, and separating by a sieve using a plate on which slits are formed, and have attained the present invention.

That is, the present invention is (a) a method for separating fine bones from fish flakes, which is characterized by conducting the following two steps in succession:

(i) the first step wherein fish flakes collected from prepared, skinned and heated fish are dispersed after dehydration by compression or centrifugation, or dehydrated by compression or centrifugation after dispersion;

(ii) the second step wherein meat is separated from fine bones by a sieve using a plate on which slits are formed.

The present invention is (b) a process for separating fine bones from fish flakes according to the above (a), wherein heating in the first step is conducted in an acidic buffer solution which is adjusted to pH 3-6.

Further, the present invention is (c) a process for separating fine bones from fish flakes according to the above (a) wherein dispersion in the first step is conducted using a way of bubbled water jetting or a rolling mean.

The present invention is (d) a process for separating fine bones from fish flakes according to the above (a), wherein the slit of the plate is 0.5-5 mm width, 3-100 mm length and arranged in lengthwise, crosswise or right inclined or left inclined directions, or a combination of two or more of them.

The present invention is (e) a process for separating fine bones from fish flakes according to any one of the above methods (a)-(d), wherein clogging is prevented by drawing the plate by suction or blowing air against the plate.

The present invention is (f) an apparatus for separating fine bones from fish flakes which is equipped with a way of bubbled water jetting or a rolling mean and a sieve to separate fine bones from fish flakes using a plate on which slits are formed.

The present invention is (g) a sieve for separating fine bones from fish flakes which comprises a rotatable cylindrical member on which slits of 0.5-5 mm width, 3-100 mm length are arranged in lengthwise, crosswise, right inclined or left inclined direction, or a combination of two or more of them.

The present invention will be explained in detail. The kinds of fish to which the process of the present invention can be applied are not particularly limited, but it is advantageous to apply it to fish which can be caught in large quantities such as Alaska pollack, Atka mackerels, Saffron cod, Hoki, Rattails, Pacific cod, Pacific salmon and the like from the economical point of view.

When the method of the present invention is carried out, the raw material fish is first prepared, skinned and heated. In this case, the term "to prepare" means to remove the portions, for example, head, tail, fin, viscera, which are not used for production of fish flakes, and there are no particular limitation to the conditions for preparation or skinning. It suffices that not so many fine bones are left.

But heating should be conducted under the conditions sufficient for heat denaturation of the meat.

Heating is conducted in an acidic buffer solution adjusted to pH 3-6 to enhance the yield of the fish flakes and to improve preservability, and further to improve qualities such as mouthfeel.

The acidic buffer solution which can be advantageously used includes, for example, a mixture of one or two of the compounds selected from the group consisting of citric acid, gluconic acid, succinic acid, tartaric acid, lactic acid, malic acid, fumaric acid, acetic acid, adipic acid, and aqueous solution of their salts.

When the process of the present invention is carried out, the pH of the acidic buffer solution is preferably from 3 to 6. When pH is less than 3, the yield of the fish flakes which is finally obtained is disadvantageously decreased. In addition, it is not preferable from the viewpoint of taste, that is the acidity of the product become stronger. On the other hand, when the acidic buffer solution at pH more than 6 is used, the yield of the fish flakes is also disadvantageously decreased.

The concentration of the buffer varies depending on the acidity of the buffer, and types and quality of the fish. For example, when citric acid and sodium citrate are used in a combination in the acidic aqueous buffer, it is preferable to adjust pH in the range from 3 to 6 using about 5-50 mmol of the solution.

Subsequently, meat is collected, and dispersed after dehydration, or dehydrated after dispersion to give fine flakes. When large fish such as Pacific salmon is used, it is preferably dispersed after roughly dehydrated. However, the meat is often collected as lumps and it is difficult to disperse them. Accordingly, it is preferable to conduct rolling using a rolling mill or the like, followed by various kinds of dispersion treatment.

Figure 5:
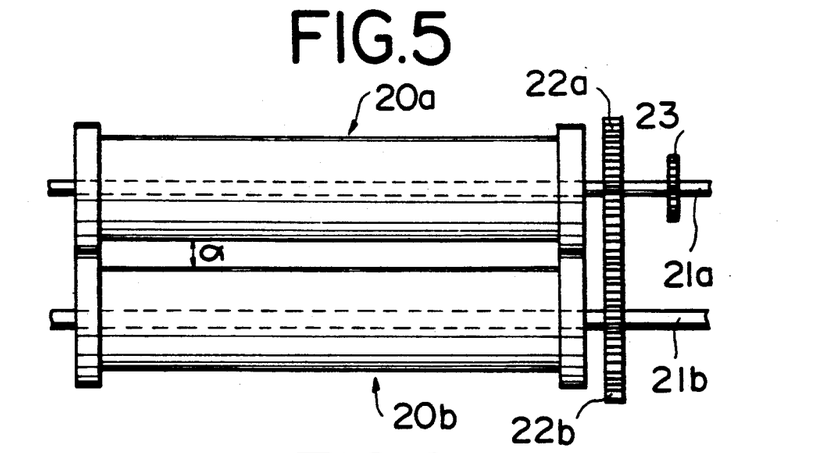
FIG. 5 is a plane view of a rolling mill.
Figure 6:
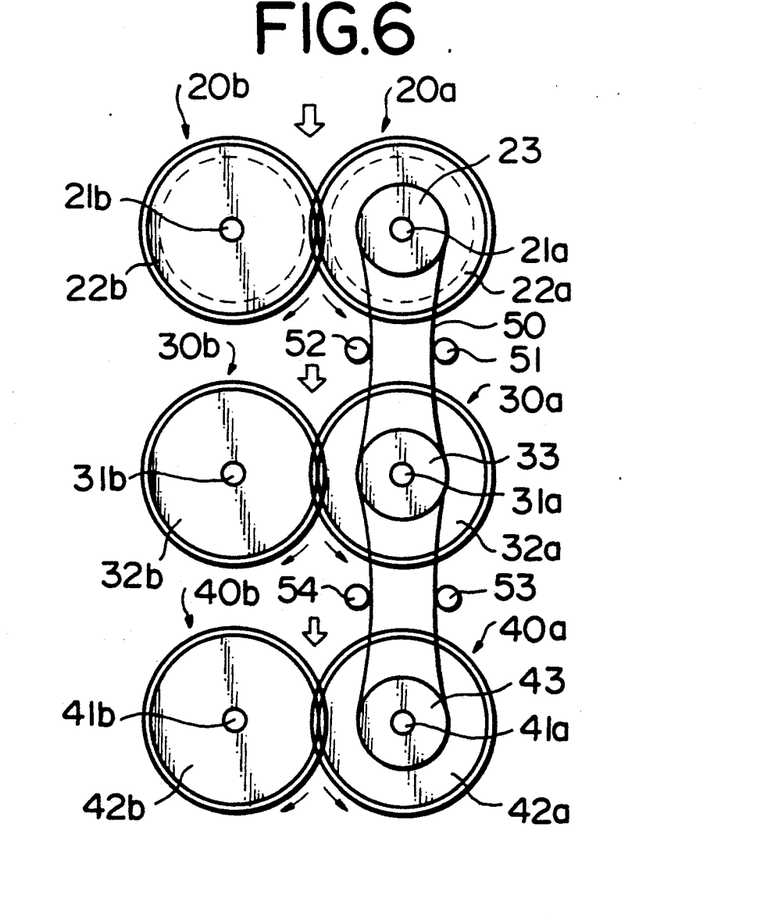
FIG. 6 is a side view of a rolling mill.

The examples of the rolling mill are ilustrated in FIGS. 5 and 6.

When Alaska pollack is used, the fish body is often small, so it is preferable to be dehydrated after dispersion. It is preferable to disperse by means, for example, jetting bubbled water.

It is preferable to jet bubbled water to the obtained fish flakes to disperse the muscle fibers as fine flakes, and at the same time, make them float on the surface of the water to separate large bones. As the bubble generator, for example, a commercially available bubble generator, for bath can be used. Thus, separation of fine bones in the next step can be quite effectively conducted.

Subsequently, the fish flakes are lightly compressed or centrifuged to dehydrate (to drain off water). Such dehydration is not necessarily conducted under severe conditions. It is sufficient that the product may not adhere but can be crumbled in hands as if it is almost dry.

Finally, fine bones are separated from meat using, for example, a metal plate with holes punched thereon as a sieve. The holes should be most preferably slits. Circle or other shapes are not preferable because the meat may pass through or the fine bones may insufficiently pass through the holes.

The preferably size of the slit is about 0.5-5 mm width and 3-100 mm length. The sieve with the slits of the above size which are arranged in lengthwise, crosswise, right inclined or left inclined direction, or a combination of two or more of them are advantageously used because they provides the highest efficiency of separation of fine bones.

Further, in the step for separation of fine bones, the first discharged flakes which once pass through a sieve can be directly provided as a product. The flakes may be subjected to another separation step. Alternatively, the first sieve passed flakes containing many fine bones may be subjected to a step for separation of fine bones again to enhance yield of fish flakes.

The sieve may be prepared using a plastic plate with slits formed thereon.

When the apparatus of the present invention is set working according to the method of the present invention, fine bones or fish flakes may adhere to the plate with slits formed thereon, resulting in clogging. For maintaining the separation ability of fine bones, it is necessary to prevent such clogging. Such clogging can be prevented by drawing by suction from discharged side or blowing air from sieve passed side to discharged side.

The intensity of suction, or the amount, intensity, temperature, humidity of the blowing air may be properly selected depending on the types, conditions of the flakes, and may not be generalized.

As explained above, the present invention is conducted to effectively separate fine bones from fish flakes with many fine bones present therein by quite simple operations, giving a chance for fish which can be caught in large quantities such as Alaska pollack, Saffron cod, Atka mackerels, Hoki, Rattails, Pacific cod, Pacific salmon and the like to be used as food materials.

DESCRIPTION OF THE PREFERRED EMBODIMENTS

Examples of the present invention will be explained with the reference to the attached drawings, but the present invention is not limited to them.

The term "%" herein used means percent by weight unless othersise indicated.

Figure 1:
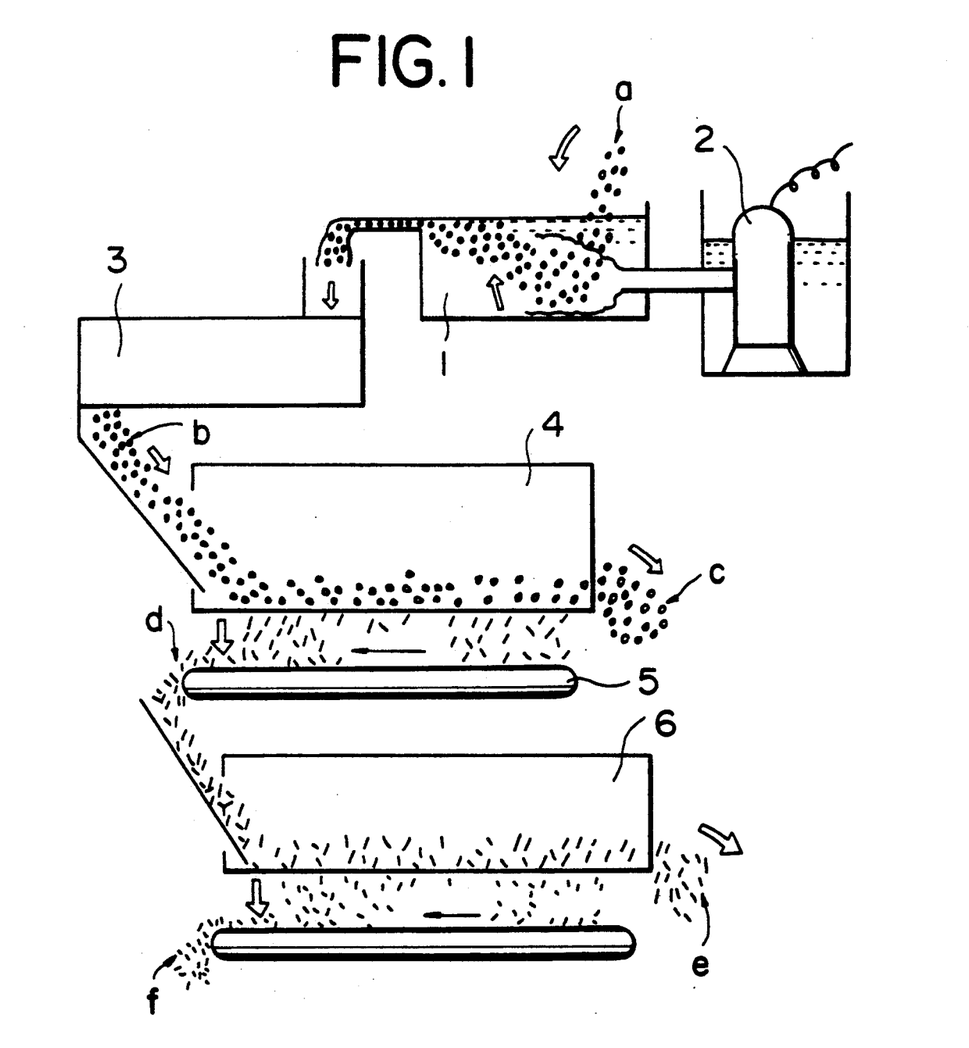
FIG. 1 is a schematic view of the step for separation of fine bones from fish flakes according to the present invention.

In FIG. 1, a is fish flakes, 1 is a tank in which fish flakes are charged, 2 is a bubble generator of a way of bubbled water jetting to put bubbled water in the tank, 3 is a screw press of dehydration means to dehydrate the fish flakes discharged from the tank, b is a dehydrated flake discharged from the screw press, 4 is a first sieve to separate fine bones from the dehydrated flakes, c is a first discharged flake after separation of fine bones by a first sieve, d is a first sieve passed flake which passes through the slits of the first sieve, 5 is a conveyer to convey the first sieve passed flakes, 6 is a second sieve to further separate fine bone from the first sieve passed flake, e is a second discharged flake after separation of fine bones using a second sieve, f is a second sieved flake which passes through the slits of the second sieve.

In FIGS. 2-4d, 10 is an example of a sieve for separation of fine bones which is cylindrical and rotates by a motor (not shown) and divided by quarters of circumference ($\alpha 1 - \alpha 4$), on which slits in different direction are formed, that is, slits arranged in lengthwise direction 10a, crosswise direction 10b, right inclined direction 10c and left inclined direction 10d are formed in parts $\alpha 1$, $\alpha 2$, $\alpha 3$ and $\alpha 4$, respectively.

The arrangement of these slits are not limited to the case of the circumferentially divided cylinder. The slits arranged in various directions may be optionally combined.

EXAMPLE 1

(1) 100 Alaska pollacks were used as raw materials. The heads, viscera, pectoral and caudal fins were cut off, and the fishes were immersed in a hot water at 100° C. for about one minute, pulled up and skinned by gently rubbing with a wooden spatula.

(2) Subsequently, dorsal and ventral fins were removed, and the fishes were washed with water and smothered with a steam at 95° C. for 15 minutes.

(3) The smothered fish bodies were gently rubbed aginst a screen (15 mm square) to give fish flakes a through the screen. The resultant was fell into a tank 1 in FIG. 1, bubbled water was jetted by a bubble generator 2, and the floated fish flakes a were dehydrated by a screw press 3 to give dehydrated flakes b.

Figure 2:
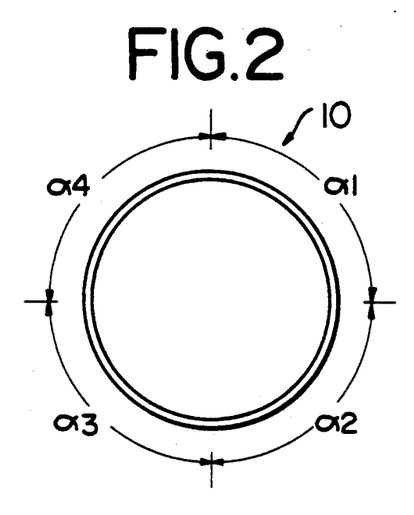
FIGS. 2 and 3 are a side view and a development of a sieve for separation of fine bones according to the present invention.
Figure 3:
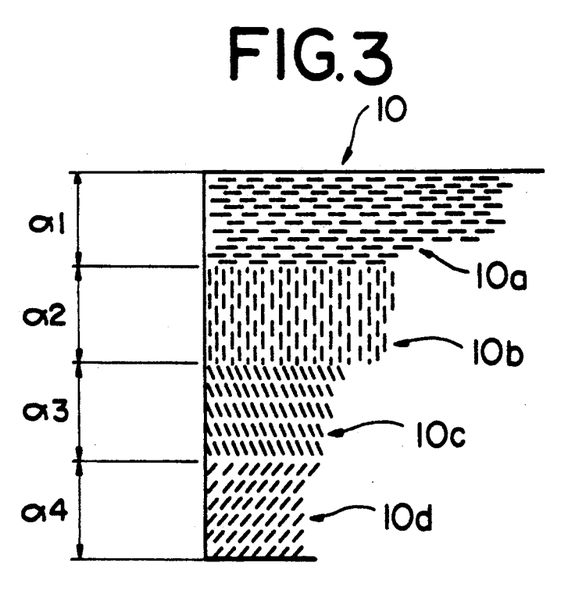
Figure 4A:
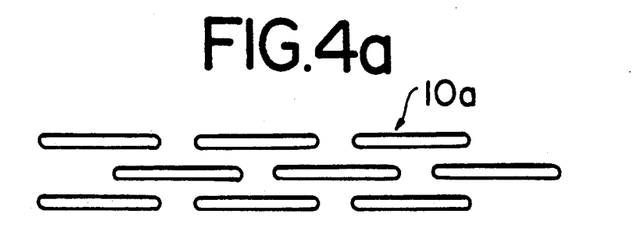
FIGS. 4a-4d are enlarged views of slits formed on a sieve.
Figure 4B:
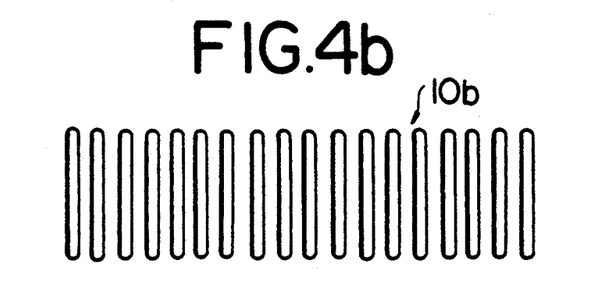
Figure 4C:
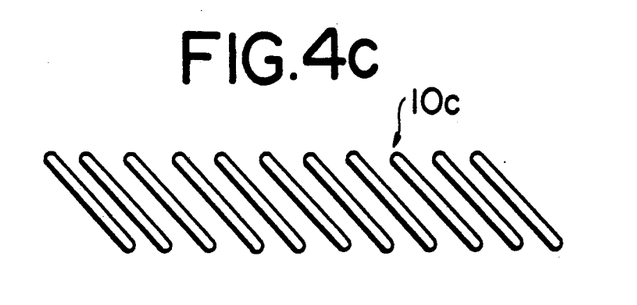
Figure 4D:
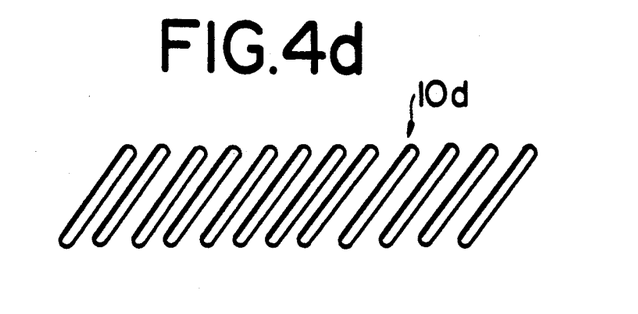

(4) Further, the dehydrated flakes b were put through a first sieve 4 which is a rotary sieve having a structure shown in FIGS. 2 and 3 to give 9,500 g of the objective fish flakes free from fine bones as first discharged flakes c.

The resulting fish flakes had natural mouthfeel suitable for various kinds of food.

The amount of the first sieve passed flakes d containing many fine bones were 1,500 g and 1,360 of fine bones were contained therein.

Subsequently, the first sieve passed flakes d conveyed by a conveyer 5 were sieved again in the same manner as the above (4) using the said rotary sieve 6 having a structure shown in FIGS. 2 and 3 with slits of 1 mm width and 5 mm length formed thereon, to give 1,100 g of the objective fish flakes containing less fine bones as second discharged flakes e. The number of fine bones contained therein was five.

The second sieve passed flakes f were 300 g and 1,230 fine bones were contained therein.

EXAMPLE 2

After the same operations of (1)-(3) of the above Example 1 were carried out, (4) the resultant was put through a rotary sieve having a structure shown in FIGS. 2 and 3 with slits of 4 mm width and 30 mm length formed thereon to give 9,900 g of the objective fish flakes containing less fine bones as first discharged flakes. Six fine bones were contained therein.

The amount of the first sieve passed flakes containing many fine bones was 1,100 g and 1,350 fine bones were contained therein.

Subsequently, the first sieve passed flakes were sieved again in the same manner as that in the above (4) using a rotary sieve having a structure shown in FIGS. 2 and 3 with slits of 1 mm width and 5 mm length formed thereon, to give 7,000 g of the objective flakes containing less fish bones as second discharged flakes and 2,900 g of second sieve passed flakes containing five bones.

Further, the first sieve passed flake was sieved again in the same manner as that in the above (4) using the above rotary sieve shown in FIGS. 2 and 3 with slits of 0.8 mm width and 5 mm length formed thereon to give 900 g of the objective fish flakes containing less fine bones as second discharged flakes. There were no fine bones contained therein.

The second sieve passed flakes were 500 g and 1,350 fine bones were contained therein.

EXAMPLE 3

(1) Seven divisions of frozen dressed Alaska pollack (10 kg for each division) were defrosted overnight, heated by blowing steam onto the surface, then skin and fins were removed. Thus the raw material for each experimental division was prepared.

(2) Subsequently, an aqueous solution with composition shown in Table 1 (30 liter was boiled, and Alaska pollack after above treatment (1) was put is said solution, boiled for 5 minutes, and the fish body was gently rubbed aginst a screen (15 mm square) to make meat into flakes to give fish flakes before separation of fine bones for each experimental division.

TABLE 1

| Experimental Division | Composition | | pH of Aqueous Solution |
|---|---|---|---|
| | Citric Acid (g) | Sodium Citrate (g) | |
| a | 0 | 0 | 6.75 |
| b | 460 | 140 | 3.01 |
| c | 518 | 70 | 2.50 |
| d | 129 | 474 | 5.11 |
| e | 32 | 38 | 4.35 |
| f | 81 | 96 | 4.20 |
| g | 162 | 192 | 4.11 |

(3) Further, fish flakes before separation of fine bones containing about 500 fine bones per kg which were obtained in the above (2) were dehydrated by compression, put through a first sieve 4, a rotary sieve having a structure shown in FIGS. 2 and 3 with slits of 3 mm width and 20 mm length formed thereon, to give fish flakes after separation of fine bones for each experimental division. The amount of the obtained flakes, the number of fine bones contained in 1 kg of flakes and acidic taste of the product are shown in Table 2.

TABLE 2

| Experimental Division | Amount of Flake Before Separation of Fine Bones (kg) | Remaining Fine Bones After Separation of Fine Bones (per kg) | Acidic taste of Flake After Separation of Fine Bones |
|---|---|---|---|
| a | 3.2 | 70 | — |
| b | 3.7 | 32 | + |
| c | 3.9 | 41 | + |
| d | 3.7 | 45 | — |
| e | 3.8 | 35 | — |
| f | 4.3 | 9 | — |
| g | 4.1 | 20 | + |

EXAMPLE 4

Pacific salmon was cut into three portions (two fillets and flesh webbed skelton), boiled in a boiling water for 10 minutes, long and thin bones at the wall of visceral cavity were removed using a wooden spatula, gently compressed to dehydrate. Thus 10 kg of flake before separation with moisture content of 66.3% was obtained.

The resulting flakes were divided in two divisions (5 kg for each).

The first portion was passed through a rolling mill which is effective to disperse fish flakes collected from a large fish into fine flakes.

The above rolling mill will be explained the reference to the attached FIG. 5 (a plain view) and FIG. 6 (a side view).

The rolling mill has two roller of about 400 mm width and about 100 mm in diameter made from plastic or the like which arranged at interval of α. In the present example, three sets of rollers, rollers 20a and 20b, 30a and 30b, and 40a and 40b were arranged in three layers.

In this case, the intervals α between rollers 20a and 20b, 30a and 30b, and 40a and 40b are 20 mm, 10 mm and 6 mm, respectively.

In FIGS. 5 and 6, 21a, 21b, 31a, 31b, 41a or 41b is a rotation axis of each roller, 22a, 22b, 32a, 32b, 42a or 42b is a gear of each roller, 23, 33 and 43 are sprockets, 50 is a chain to be engaged with each sprocket, 51-54 are guides of the chain 50.

Running of said roller of the rolling mill is not shown, it can be performed by manual labor using handle or by motive power.

Cogged belts and the like may be used instead of the chain.

When fish flakes are rolled in the top rollers 20a and 20b of such roller, fish flakes are dispersed and discharged between the bottom rollers 40a and 40b.

Subsequently, fine bones were separated from the dispersed fish flakes using a first sieve 4 to give 4.6 kg of first discharged flakes.

As a control, the second division was directly put through a first sieve 4 to separate fine bones to give 4.6 kg of first discharged flakes.

The number of fine bones in the first discharged flakes of each division after separation was measured and shown in Table 3.

TABLE 3

| | Number of Fine Bones in 1 kg of Flakes |
|---|---|
| First Division | 3 |
| Second Division | 21 |

REFERENCE EXAMPLE 1

In the same manner as that in Example 1, except that (3) dispersion and floating operation by bubbled water were not carried out, fish flake were obtained. The items are shown below.

| Flake | Collected amount | Number of Fine Bones |
|---|---|---|
| First Discharged Flake | 9,400 g | 40 |
| First Sieve Passed Flake | 1,500 g | 1,420 |

The result of the second sieving conducted in the same manner as that in Example 1 using the first sieve passed flakes is shown below.

| Flake | Collected amount | Number of Fine Bones |
|---|---|---|
| Second Discharged Flake | 1,100 g | 6 |
| Second Sieve Passed Flake | 400 g | 1,360 |

I claim:

1. A process for separating fine bones from fish flakes obtained from fish after said fish are prepared, skinned and heated in water or steam comprising
   a) dehydrating said fish flakes containing said fine bones by subjecting said fish flakes to compression or centrifugation sufficient to remove essentially most of the water therefrom,
   b) dispersing said fish flakes and fine bones, c) passing said dispersed fish flakes and fine bones over a surface having a plurality of slits therein, said slits being of a size sufficient to permit said fine bones to pass therethrough but of a size insufficient to permit the major portion of said fish flakes from passing through said slits, and d) removing said major portion of said fish flakes from said surface.

2. The process for separating fine bones from fish flakes as defined in claim 1 wherein said fish, after being prepared and skinned, are heated in an aqueous medium having a pH of 3-6 prior to removing fish flakes from said fish.

3. A process for separating fine bones from fish flakes obtained from fish after said fish are prepared, skinned and heated in water or steam comprising, a) dispersing said fish flakes containing said fine bones and separating a substantial number of said fine bones from said fish flakes, b) dehydrating said fish flakes containing the remainder of said fine bones by subjecting said fish flakes and bones to compression or centrifugation sufficient to remove essentially most of the water therefrom, c) passing said dispersed fish flakes and fine bones over a surface having a plurality of slits therein, said slits being of a size sufficient to permit said fine bones to pass therethrough but of a size insufficient to permit the major portion of said fish flakes from passing through said slits, and d) removing said major portion of said fish flakes from said surface.

4. The process for separating fine bones from fish flakes as defined in claim 3 wherein said fish, after being prepared and skinned, are heated in an aqueous medium having a pH of 3-6 prior to removing fish flakes from said fish.

5. The process for separating fine bones from fish flakes as defined in claims 3 or 4 wherein the step of dispersing said fish flakes and fish bones comprises a) passing said fish flakes between a pair of rotating surfaces spaced from each other a distance sufficient to break up the fish flakes to a size sufficient to pass through said space between said rotating surfaces and b) passing said fish flakes coming through the space between said pair of rotating surfaces between at least another pair of rotating surfaces spaced from each other a distance less than said first pair of rotating surfaces to further break up the size of the fish flakes.

6. The process for separating fine bones from fish flakes as defined in claims 3 or 4 wherein the step of dispersing said fish flakes and fish bones comprises a) placing said fish flakes containing fine bones in an aqueous medium, b) bubbling a gaseous medium through said aqueous medium to disperse said fish flakes and c) removing said dispersed fish flakes from said aqueous medium.

7. The process for separating fine bones from fish flakes as defined in claims 1, 3, 2 or 4 which includes the step of applying suction to the side of said surface having a plurality of slits therein from which said fine bones emerge, said suction applied in an amount sufficient to prevent clogging of said slits.

8. The process for separating fine bones from fish flakes as defined in claims 1, 3, 2 or 4 which includes the step of blowing air onto said surface having a plurality of slits therein into which said fine bones enter, said air being blown in an amount sufficient to prevent clogging of said slits.

9. An apparatus for separating fine bones from fish flakes comprising a) a tank adapted for holding said fish flakes and fine bones in an aqueous medium, b) means for bubbling a gaseous medium through said aqueous medium in said tank to disperse said fish flakes and fine bones, c) dehydrating means for receiving said dispersed fish flakes and fine bones from said tank and extracting said water therefrom, d) means for carrying said dehydrated and dispersed fish flakes and fine bones to and across a surface having a plurality of slits formed therein, said slits being of a size sufficient to permit said fine bones to pass therethrough but of a size insufficient to permit the major portion of said fish flakes from passing through said slits.

10. An apparatus for separating fine bones from fish flakes comprising a) a pair of rotatable surfaces spaced from each other a distance sufficient to break and disperse fish flakes entering the space between said surfaces to a size sufficient to pass through said space between said surfaces, b) dehydrating means for receiving said fish flakes and fine bones passing through said space between said rotatable surfaces, and c) means for carrying said dispersed fish flakes and fine bones to and across a surface having a plurality of slits formed therein, said slits being of a size sufficient to permit said fine bones to pass therethrough but of a size insufficient to permit the major portion of said fish flakes from passing through said slits.

11. The apparatus for separating fine bones from fish flakes as defined in claims 9 or 10, said apparatus including means for preventing clogging of said slits.

12. The apparatus for separating fine bones from fish flakes as defined in claim 11 wherein said means for preventing clogging of said slits comprises suction means for applying a suction to the side of said surface containing a plurality of slits through which said fine bones have passed.

13. The apparatus for separating fine bones from fish flakes as defined in claim 11 wherein said means for preventing clogging includes means for blowing a gaseous medium through said slits in the direction in which the fine bones pass through said slits.

14. The apparatus for separating fine bones from fish flakes as defined in claims 9 or 10 wherein said slits are arranged lengthwise, crosswise, right inclined or left inclined or a combination of two or more of such arrangements relative to the direction of flow of the fish flakes and fine bones over said surface, said slits having a width of from 0.5 to 5 mm and a length of from 3-100 mm.

15. The apparatus for separating fine bones from fish flakes as defined in claim 14 wherein said slits have a width of from 1-5 mm and a length of from 5-30 mm.

16. The apparatus for separating fine bones from fish flakes as defined in claims 9 or 10 wherein said surface having a plurality of slits formed therein is a cylindrical surface adapted for rotation about its longitudinal axis, said cylindrical surface having a plurality of zones with the slits in each zone arranged to lie in a direction different from the slits in each adjacent zone, relative to the longitudinal axis of said cylindrical surface.

17. The apparatus for separating fine bones from fish flakes as defined in claim 16 wherein said cylindrical surface has four zones, each zone extending longitudinally of said cylindrical surface, and each zone being of a size of about one-quarter of said cylindrical surfaces,
   the slits in one of said zones extending in the direction of the longitudinal axis of said cylindrical surface,
   the slits in the second of said zones extending in a direction perpendicular to the longitudinal axis of said cylindrical surface,
   the slits in the third of said zones extending in a direction inclined to one side of the longitudinal axis of said cylindrical surface, and
   the slits in the fourth of said zones extending in a direction inclined to the opposite side of the direction in which the slits in said third zone extend.

18. The apparatus as defined in claims 9 or 10 wherein said dehydrating means is a means for compressing the fish flakes to extract the water therefrom or a means for centrifuging the fish flakes to extract the water therefrom.

19. A sieve for separating fine bones from fish flakes comprising a cylindrical member having a plurality of slits therein, said slits having a width of 0.5-5 mm and a length of 3-100 mm, said slits being arranged to lie in a direction lengthwise or crosswise or inclined to the left or inclined to the right relative to the longitudinal axis of said cylindrical member, or a combination of two or more of such arrangements of slits.

20. A sieve for separating fine bones from fish flakes comprising a cylindrical member having a plurality of slits therein, said cylindrical member having a plurality of zones extending longitudinally thereof, the slits in each zone arranged to lie in a direction different from the slits in each adjacent zone relative to the longitudinal axis of said cylindrical member.

21. The sieve for separating fine bones from fish flakes as defined in claim 20 wherein said cylindrical member has four zones, each zone being of a size of about one-fourth of said cylindrical member,
   the slits in one of said zones extending in the direction of the longitudinal axis of said cylindrical member,
   the slits in a second of said zones extending in a direction perpendicular to the longitudinal axis of said cylindrical member,
   the slits in the third zone extending in a direction inclined to one side of the longitudinal axis of said cylindrical member and
   the slits in the fourth zone inclined in a direction opposite the direction in which the slits in the third zone are inclined.

* * * * *